US012759620B2

(12) United States Patent
Shibata et al.

(10) Patent No.: US 12,759,620 B2
(45) Date of Patent: Oct. 13, 2026

(54) MOTOR CONTROL DEVICE FOR STEER-BY-WIRE STEERING DEVICE

(71) Applicants: TOYOTA JIDOSHA KABUSHIKI KAISHA, Toyota (JP); JTEKT CORPORATION, Kariya (JP); DENSO CORPORATION, Kariya (JP)

(72) Inventors: Kenji Shibata, Nagoya (JP); Koichi Nishimura, Toyota (JP); Takahito Ishino, Numazu (JP); Ryo Yamazaki, Okazaki (JP); Hiroyasu Inoue, Kashihara (JP); Isao Namikawa, Okazaki (JP); Nobuyori Nakajima, Kariya-city (JP); Hiroki Tomizawa, Kariya-city (JP); Takuya Maegawa, Kariya-city (JP)

(73) Assignees: TOYOTA JIDOSHA KABUSHIKI KAISHA, Toyota (JP); JTEKT CORPORATION, Kariya (JP); DENSO CORPORATION, Kariya-city (JP)

( * ) Notice: Subject to any disclaimer, the term of this patent is extended or adjusted under 35 U.S.C. 154(b) by 326 days.

(21) Appl. No.: 18/602,619

(22) Filed: Mar. 12, 2024

(65) Prior Publication Data

US 2024/0308574 A1 Sep. 19, 2024

(30) Foreign Application Priority Data

Mar. 17, 2023 (JP) ................................. 2023-042993

(51) Int. Cl.
*B62D 5/04* (2006.01)
*B62D 6/00* (2006.01)

(52) U.S. Cl.
CPC ........... *B62D 5/0463* (2013.01); *B62D 6/002* (2013.01)

(58) Field of Classification Search
CPC ...... B62D 5/0463; B62D 6/002; B62D 5/001; B62D 5/0481; B62D 5/0403; B62D 5/046; B62D 6/00
See application file for complete search history.

(56) References Cited

U.S. PATENT DOCUMENTS

2019/0260324 A1 8/2019 Kuramitsu et al.
2020/0094871 A1* 3/2020 Lee ...................... B62D 5/0481
(Continued)

FOREIGN PATENT DOCUMENTS

JP 2016165174 * 3/2015 ............... B62D 5/04
JP 2018-130007 A 8/2018

*Primary Examiner* — Valentin Neacsu
*Assistant Examiner* — Marlon A Arce
(74) *Attorney, Agent, or Firm* — Sughrue Mion, PLLC

(57) ABSTRACT

In a motor control device for a steer-by-wire steering device, the motor control device having a redundant system consisting of two systems, a first turning current command value is calculated in a first system, and a second turning current command value is calculated in a second system. A third processor outputs the first turning current command value when the two current command values are not divergent and outputs the second turning current command value when the two current command values are divergent. When a determination of a rapid steering operation is made, the third processor outputs the first turning current command value regardless of whether or not the two current command values are divergent.

5 Claims, 6 Drawing Sheets

(56) References Cited

U.S. PATENT DOCUMENTS

| | | | | |
|---|---|---|---|---|
| 2022/0089218 | A1* | 3/2022 | Kodera .................. | B62D 6/002 |
| 2024/0308574 | A1* | 9/2024 | Shibata .................. | B62D 6/002 |
| 2024/0391524 | A1* | 11/2024 | Kim ....................... | B62D 6/008 |

* cited by examiner

MOTOR CONTROL DEVICE FOR STEER-BY-WIRE STEERING DEVICE

CROSS REFERENCE TO RELATED APPLICATION

This application claims priority to Japanese Patent Application No. 2023-042993 filed on Mar. 17, 2023 which is incorporated herein by reference in its entirety including the specification, claims, drawings, and abstract.

TECHNICAL FIELD

The present disclosure relates to a steer-by-wire steering device, and more particularly to a control device for a motor used for a turning actuator for turning a wheel.

BACKGROUND

In a conventional steering device, a steering wheel operated by a driver is mechanically coupled with a wheel to be turned. This contrasts with in the steer-by-wire steering device, in which the steering wheel is not mechanically coupled with the vehicle wheel to be turned. In the steer-by-wire steering device, a steering angle as an angle of a steering operation of the steering wheel is converted into an electric signal. Based on the electric signal, a turning actuator turns the vehicle wheel. To the steering wheel, a steering reaction force which simulates a response feeling of an operation in the conventional steering wheel is applied by a reaction force actuator. The turning actuator and the reaction force actuator are configured by using electric motors. In general, a ratio of a turning angle to the steering angle of the steer-by-wire steering device is high compared to that of the conventional steering device. In other words, in a case where the steering angle is the same, as for the turning angle of a turned wheel, the turning angle in the steer-by-wire steering device is larger than the turning angle in the conventional steering device.

JP 2018-130007 A discloses a control device ECU 10 which controls a motor 80 included in an electric power steering device 8. In the electric power steering device, a steering wheel is mechanically coupled with turned wheels. The motor 80 has a first motor winding 180 and a second motor winding 280. The control device 10 includes a first system L1 corresponding to the first motor winding 180 and a second system L2 corresponding to the second motor winding 280. A current command value I1' is calculated in the first system L1, and a current command value I2' is calculated in the second system L2. In the second system L2, the current command value I1' of the first system is compared with the current command value I2' of the second system. In a case where those are not divergent (normal case), a current is supplied to the first motor winding 180 and the second motor winding 280 based on the current command value I1' of the first system (cooperative control). In a case where the current command value I1' of the first system and the current command value I2' of the second system are divergent (abnormal case), a current is supplied to the first motor winding 180 based on the current command value I1' of the first system, and a current is supplied to the second motor winding 280 based on the current command value I2' of the second system (independent control) (see paragraphs 0198 to 0202). Note that the above reference characters are reference characters used in the above related art document but are not related to reference characters used in a description about an embodiment of the present application.

SUMMARY

In a steer-by-wire steering device, as compared with a conventional steering device such as an electric power steering device, unevenness in current command values for electric motors of a turning actuator tends to become large. As a result, a divergence between the current command values of two systems might become large. For example, in the steer-by-wire steering device, because a steering angle is converted into an electric signal and is thereby used for turning control, unevenness in command values occurs due to a detection error of the steering angle. In the steer-by-wire steering device, a turning angle relative to the steering angle is larger than in the conventional steering device, the detection error of the steering angle is amplified, and unevenness in the command values arises. When unevenness in the command values becomes large, a divergence between the command values of the two systems might become large. In particular, this tendency appears in a rapid steering operation in which the steering angle changes greatly, and a wrong determination is likely to be made about an abnormality determination based on the divergence between the current command values of the two systems.

An object of the present disclosure is to reduce opportunities in which control based on a wrong determination about an abnormality determination about a device is executed in a rapid steering operation.

A motor control device according to the present disclosure controls a motor used for a turning actuator of a steer-by-wire steering device and having a first coil set and a second coil set. The motor control device includes: a first driving circuit which supplies to the first coil set a driving current based on a command value; a second driving circuit which supplies to the second coil set a driving current based on a command value; a first processor configured to calculate a first command value based on a first detection value of a steering angle of a steering wheel and send the first command value to the first driving circuit; a second processor configured to calculate a second command value based on a second detection value of the steering angle of the steering wheel; and a third processor configured to send the first command value to the second driving circuit when the first command value and the second command value are not divergent and to send the second command value to the second driving circuit when the first command value and the second command value are divergent. The third processor is configured such that in a rapid steering state, the third processor sends the first command value to the second driving circuit regardless of whether or not the first command value and the second command value are divergent.

When the steering device is in the rapid steering state, execution of control based on a wrong determination due to a rapid steering operation can be inhibited.

In the above motor control device, in addition to or instead of the above configuration corresponding to the rapid steering operation, the third processor may be configured such that when an autonomous steering state is not established, the third processor sends the first command value to the second driving circuit regardless of whether or not the first command value and the second command value are divergent.

Only in a situation where the rapid steering operation is not performed, an abnormality determination result is reflected.

In the above motor control device, the third processor may be configured to make a determination of the rapid steering state when a turning angle of a wheel, the turning angle being calculated based on the steering angle, is a predetermined value or greater and when a turning angular velocity of the wheel, the turning angular velocity being calculated based on the steering angle, is a predetermined value or greater.

In the above motor control device, the first processor may be configured to calculate the first command value by feedback calculation about a turning angle and a turning angular velocity of the wheel, the second processor may be configured to calculate the second command value by the feedback calculation about the turning angle and the turning angular velocity of the wheel, and the third processor may be configured to make a determination of the rapid steering state when a difference between a deviation between a target value of the turning angle and an actual value in the first processor and a deviation between a target value of the turning angle and an actual value in the second processor is a predetermined value or greater, when a difference between a deviation between a target value of the turning angular velocity and an actual value in the first processor and a deviation between a target value of the turning angular velocity and an actual value in the second processor is a predetermined value or greater, or when a difference between an actual value of a turning angular velocity in the first processor and an actual value of the turning angular velocity in the second processor is a predetermined value or greater.

BRIEF DESCRIPTION OF DRAWINGS

An embodiment of the present disclosure will be described based on the following figures, wherein.

DESCRIPTION OF EMBODIMENT

Figure 1:
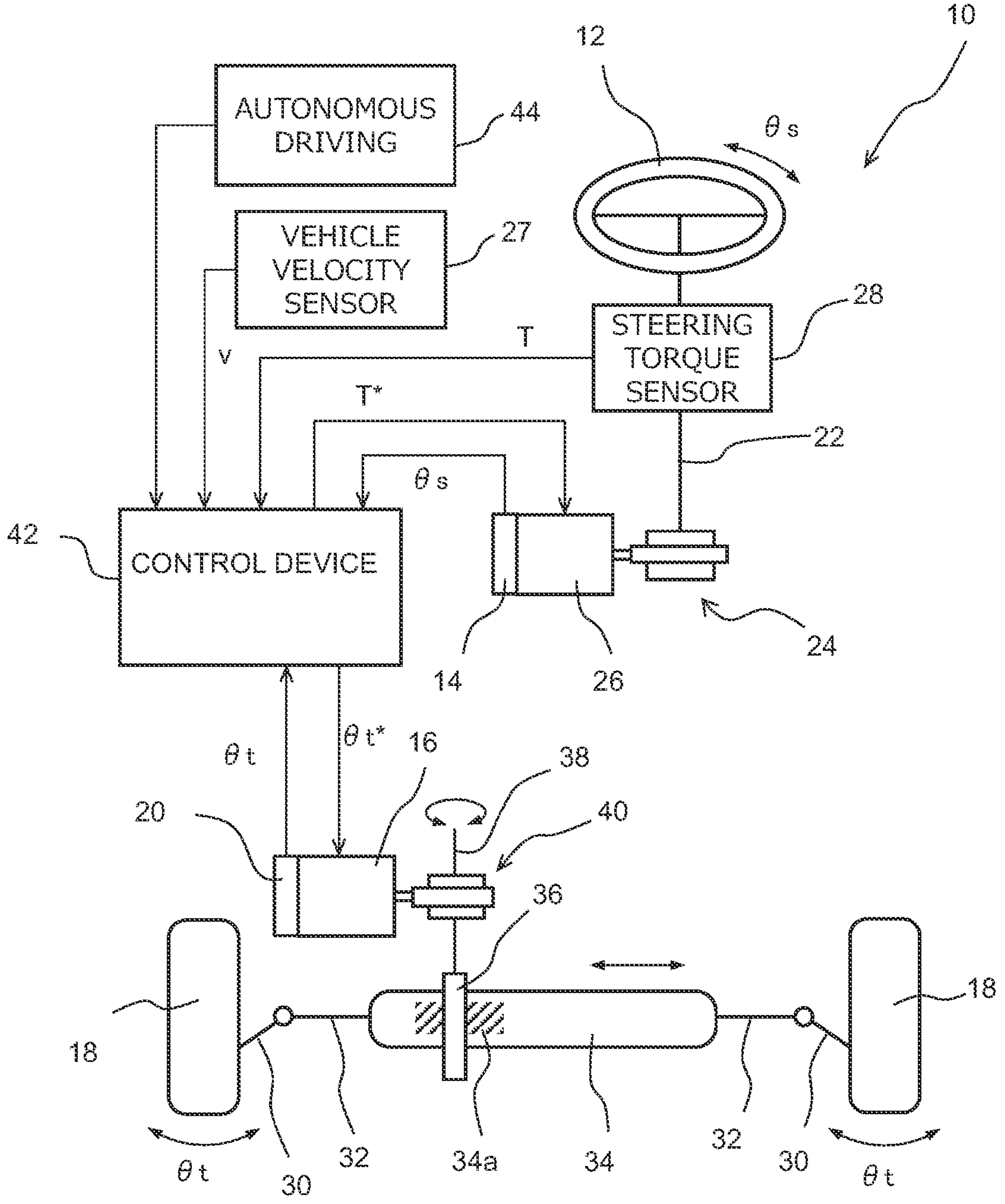
FIG. 1 is a diagram illustrating an outline configuration of a steer-by-wire steering device.

An embodiment of the present disclosure will hereinafter be described with reference to the drawings. FIG. 1 is a diagram illustrating an outline configuration of a steering device 10. The steering device 10 is a steer-by-wire steering device. In the steer-by-wire steering device, a steering wheel operated by a driver is not mechanically coupled with turned wheels which are turned in accordance with a motion of the steering wheel. The steering device 10 has a steering wheel 12 which is operated by the driver. An angle of rotation of the steering wheel 12 from a neutral position is a steering angle. The steering angle is detected by a steering angle sensor 14, and a turning actuator 16 turns turned wheels 18 based on the detected steering angle. In a typical vehicle, front wheels serve as the turned wheels 18. An angle of a turn of the turned wheel 18 from a neutral position is a turning angle. The turning angle is detected by a turning angle sensor 20. When a vehicle travels straight, the steering wheel 12 and the turned wheels 18 are in the neutral positions, and the steering angle and the turning angle are 0°. The steering wheel 12 and the turned wheels 18 are rotatable and turnable both clockwise and counterclockwise.

The steering wheel 12 is joined to a steering shaft 22. A reaction force actuator 26 is connected with the steering shaft 22 via a connection mechanism 24. The connection mechanism 24 connects the reaction force actuator 26 with the steering shaft 22 such that an action of the reaction force actuator 26 and rotation of the steering shaft 22 are in a unique correspondence relationship. The reaction force actuator 26 may be configured with a rotating electric motor. In this case, a rotation angle of the reaction force actuator (electric motor) and the steering angle are in a unique correspondence relationship. The connection mechanism 24 may be a gear mechanism and may particularly be a gear pair which is configured with a worm and a worm wheel. The reaction force actuator 26 exerts a reaction torque, which corresponds to a vehicle velocity, the steering angle, a steering angular velocity, or the like, on the steering wheel 12. The vehicle velocity is detected by a vehicle velocity sensor 27. On the steering shaft 22, a steering torque sensor 28 is provided which detects a torque applied to the steering shaft 22 by steering by the driver. A steering torque T detected by the steering torque sensor 28 is used for feedback control in the reaction force actuator 26. The reaction torque is exerted, and the driver can thereby feel a response feeling of a steering operation. The above-described steering angle sensor 14 may be a sensor which detects a rotation angle of a rotor of the electric motor as the reaction force actuator 26.

The turned wheel 18 is rotatably supported by a steering knuckle (not illustrated). A knuckle arm 30 of the steering knuckle is coupled with a tie rod 32 to be bendable at a coupling point. The tie rod 32 is coupled with a steering rack 34 to be bendable at a coupling point. The steering rack 34 has rack teeth 34*a*, and the rack teeth 34*a* mesh with a pinion 36. The pinion 36 is coaxially fixed on a pinion shaft 38. The pinion shaft 38 is connected with the turning actuator 16 via a connection mechanism 40. The connection mechanism 40 may be a gear mechanism and may particularly be a gear pair which is configured with a worm and a worm wheel. The connection mechanism 40 connects the turning actuator 16 with the pinion shaft 38 such that an action of the turning actuator 16 and rotation of the pinion shaft 38 are in a unique correspondence relationship. The turning actuator 16 may be configured with a rotating electric motor. When the turning actuator 16 acts, the pinion 36 rotates, and the steering rack 34 moves in a longitudinal direction. Movement of the steering rack 34 is transmitted to the turned wheels 18 via the tie rods 32 and the knuckle arms 30, and as a result, the turned wheels 18 are turned. In a case where the turning actuator 16 is configured with a rotating electric motor, a rotation angle of a rotor of the electric motor and the turning angle are in a unique correspondence relationship. The above-described turning angle sensor 20 may be a sensor which detects the rotation angle of the rotor of the electric motor as the turning actuator 16. Feedback control is performed for the turning actuator 16 based on the turning angle detected by the turning angle sensor 20.

The reaction force actuator 26 and the turning actuator 16 are controlled by a control device 42. The control device 42 calculates a target reaction force T* as a control target based on a vehicle velocity v from the vehicle velocity sensor 27, the steering torque T from the steering torque sensor 28, and a steering angle $\theta_s$ from the steering angle sensor 14. The control device 42 controls the reaction force actuator 26 such that the steering torque T becomes the target reaction force T*. The control device 42 calculates a target turning angle $\theta_t$* as a control target based on the steering angle $\theta_s$. The control device 42 controls the turning actuator 16 such that a turning angle $\theta_t$ becomes the target turning angle $\theta_t$*.

A vehicle has been known which is capable of autonomous driving or driving assistance. Autonomous driving is a system in which all or a part of maneuvers of the vehicle are performed not by a person but autonomously by a machine. Among kinds of autonomous driving, a case where either one or both of operations of acceleration and deceleration of the vehicle and steering operations are performed may be referred to as driving assistance. In a case where the vehicle including the steering device 10 includes an autonomous driving system 44, in autonomous driving, the control device 42 controls turning based on a command from the autonomous driving system 44. A state where the control device 42 performs steering instead of the driver will be denoted as an autonomous steering state.

The control device 42 may be configured with one processor. Alternatively, the control device 42 may be configured with plural processors which collaboratively process a function of the control device 42.

Figure 2:
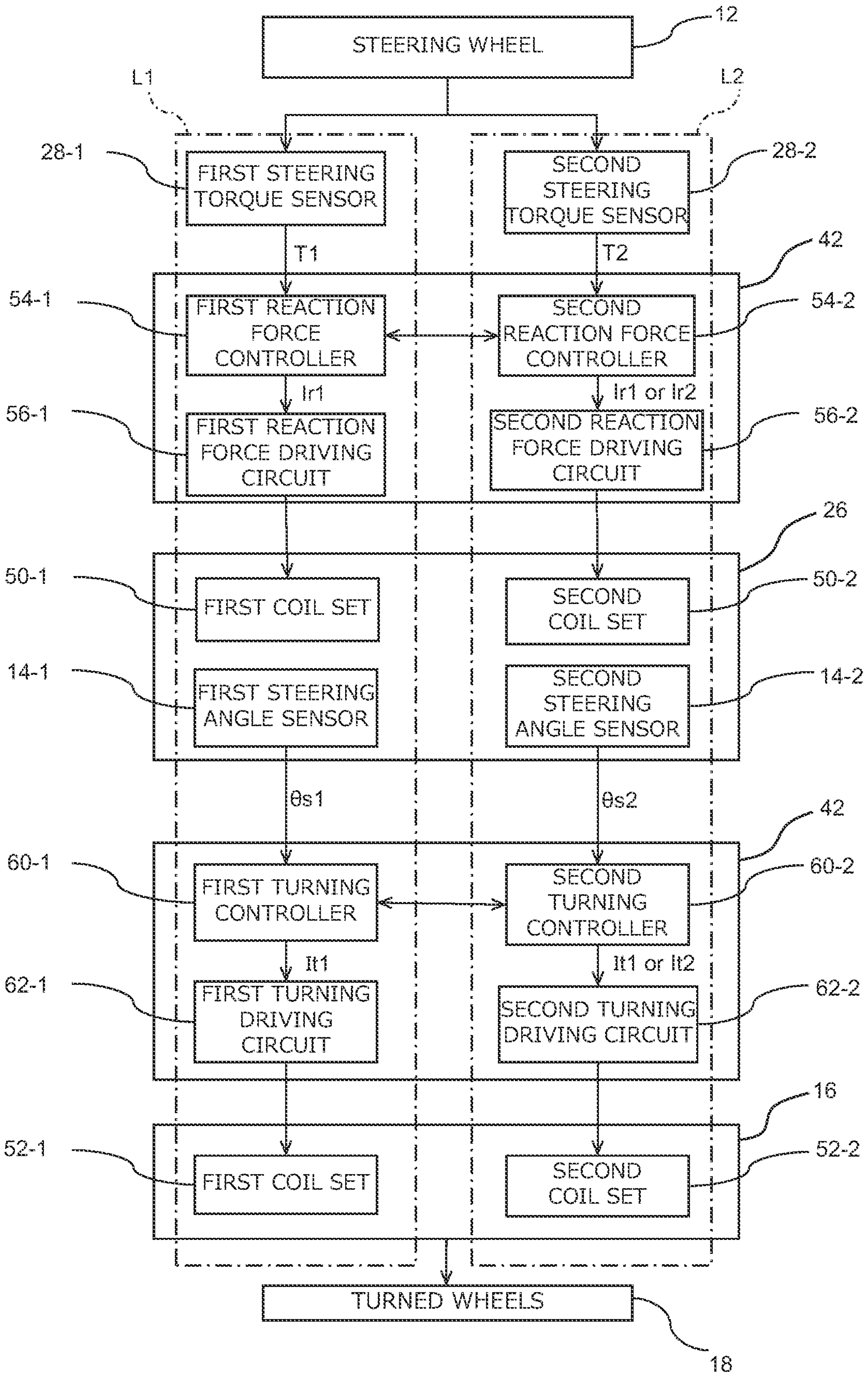
FIG. 2 is a diagram illustrating a system configuration related to control of the steer-by-wire steering device.

FIG. 2 is a block diagram illustrating a system configuration related to control of the steering device 10. A control system of the steering device 10 configures a redundant system consisting of two systems. A first system will be denoted by "$L_1$", and a second system will be denoted by "$L_2$". For an element belonging to the first system $L_1$, a word "first" is added to the name of the element, and a suffix "$_{-1}$" or "$_1$" is added to its reference character as needed. For an element belonging to the second system $L_2$, a word "second" is added to the name of the element, and a suffix "$_{-2}$" or "$_2$" is added to its reference character as needed.

The electric motor of the turning actuator 16 has two coil sets 52$_{-1}$ and 52$_{-2}$. The first coil set 52$_{-1}$ is set on first teeth (not illustrated) of a stator, and the second coil set 52$_{-2}$ is set on second teeth (not illustrated) which are different from the first teeth. The first teeth and the second teeth may be arranged in the same phase. Alternatively, the first teeth and the second teeth may be arranged to have a phase difference. The phase difference may be 30°, for example. A cogging torque can be decreased by providing the phase difference, thereby enabling smooth driving. The two coil sets 52$_{-1}$ and 52$_{-2}$ may be set on shared teeth.

Similar to the electric motor of the above-described turning actuator 16, the electric motor of the reaction force actuator 26 has two coil sets 50$_{-1}$ and 50$_{-2}$. A form of setting the two coil sets 50$_{-1}$ and 50$_{-2}$ on teeth is similar to the case of the turning actuator 16.

The reaction force actuator 26 is controlled based on the steering torque T. The steering torque T by an operation of the steering wheel 12 is detected by steering torque sensors 28$_{-1}$ and 28$_{-2}$. In the first system $L_1$, a first reaction force controller 54$_{-1}$ calculates a target reaction force based on a first steering torque $T_1$ detected by the steering torque sensor 28$_{-1}$ and sends to a first reaction force driving circuit 56$_{-1}$ a first reaction force current command value $I_{r1}$, which corresponds to the target reaction force. The first reaction force driving circuit 56$_{-1}$ supplies a driving current based on the first reaction force current command value $I_{r1}$ to the first coil set 50$_{-1}$ of the reaction force actuator 26. Meanwhile, in the second system $L_2$, a second reaction force controller 54$_{-2}$ calculates a target reaction force based on a steering torque $T_2$ detected by the second steering torque sensor 28$_{-2}$ and calculates a second reaction force current command value $I_{r2}$ which corresponds to the target reaction force. The second reaction force controller 54$_{-2}$ compares the second reaction force current command value $I_{t2}$ with the first reaction force current command value $I_{r1}$ calculated in the first system $L_1$. When those are not divergent, the second reaction force controller 54$_{-2}$ sends the first reaction force current command value $I_{r1}$ to a second reaction force driving circuit 56$_{-2}$. On the other hand, when the first reaction force current command value $I_{r1}$ diverges from the second reaction force current command value $I_{r2}$, the second reaction force controller 54$_{-2}$ sends the second reaction force current command value $I_{r2}$ to the second reaction force driving circuit 56$_{-2}$. The second reaction force driving circuit 56$_{-2}$ supplies to the second coil set 50$_{-2}$ a driving current based on the first or second reaction force current command value $I_{r1}$ or $I_{r2}$, which is received.

The turning actuator 16 is controlled based on the steering angle $\theta_s$. In the first system $L_1$, a first turning controller 60$_{-1}$ calculates a target turning angle $\theta_{t1}$* (see FIG. 3) based on a steering angle $\theta_{s1}$ detected by a first steering angle sensor 14$_{-1}$ and sends a first turning current command value $I_1$, which corresponds to the target turning angle $\theta_{t1}$*, to a first turning driving circuit 62$_{-1}$. The first turning driving circuit 62$_{-1}$ supplies a driving current based on the first turning current command value $I_{t1}$ to the first coil set 52$_{-1}$ of the turning actuator 16. Meanwhile, in the second system $L_2$, a second turning controller 60$_{-2}$ calculates a target turning angle $\theta_{t2}$* (see FIG. 3) based on a steering angle $\theta_{s2}$ detected by a second steering angle sensor 14$_{-2}$ and calculates a second turning current command value $I_{t2}$ which corresponds to the target turning angle $\theta_{t2}$*. The second turning controller 60$_{-2}$ compares the second turning current command value $I_{t2}$ with the first turning current command value $I_{t1}$ calculated in the first system $L_1$. When those are not divergent, the second turning controller 60$_{-2}$ sends the first turning current command value $I_1$ to a second turning driving circuit 62$_{-2}$. On the other hand, when the second turning current command value $I_{t2}$ diverges from the first turning current command value $I_{t1}$, the second turning controller 60$_{-2}$ supplies the second turning current command value $I_{t2}$ to the second turning driving circuit 62$_{-2}$. However, as described in detail later, even in a case where a divergence between the turning current command values arises in relation to a rapid steering operation, the second turning controller 60$_{-2}$ may supply the first turning current command value $I_{t1}$ to the second turning driving circuit 62$_{-2}$.

Because the first system $L_1$ and the second system $L_2$ have the same configuration, the first turning current command value $I_{t2}$ of the first system and the second turning current command value $I_2$ of the second system are ideally equivalent. When an absolute value of the difference between the first turning current command value $I_{t1}$ and the second turning current command value $I_{t2}$ is a predetermined value or smaller, the second turning controller 60$_{-2}$ determines that the first system $L_1$ and the second system $L_2$ are normal. When the absolute value of the difference between the first turning current command value $I_{t1}$ and the second turning current command value $I_{t2}$ exceeds the predetermined value, the second turning controller 60$_{-2}$ determines that either one of the first system $L_1$ and the second system $L_2$ is abnormal. In a case where a determination of "normal" is made, the first system $L_1$ and the second system $L_2$ are controlled based on the same command value (first turning current command value $I_{t1}$). Accordingly, sound and vibration produced by the actuator can be suppressed to a low level. In a case where abnormality arises in the first system $L_1$, control of the second system $L_2$ is independent from the first system $L_1$, and propagation of the abnormality of the first system $L_1$ to the second system $L_2$ can thereby be prevented. In a case where abnormality arises the second system $L_2$, the first system $L_1$ is normal. Thus, even when abnormality arises in one of the first system $L_1$ and the second system $L_2$, the other acts normally. The steering device 10 is configured such that its action falls in a permissible range so long as one of the first system $L_1$ and the second system $L_2$ is normal. In the following, “absolute value of difference” will simply be expressed as “difference”.

Figure 3:
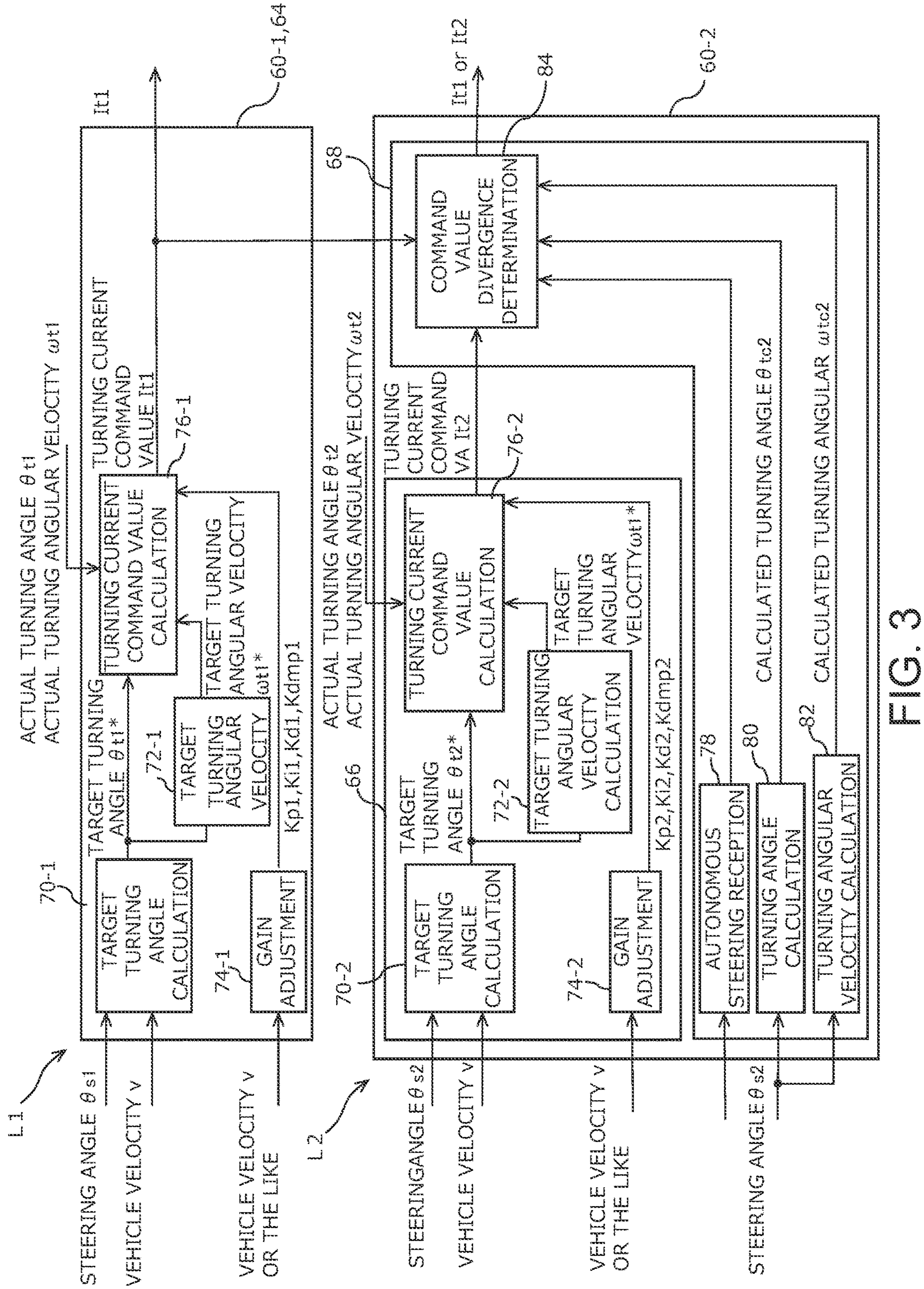
FIG. 3 is a block diagram illustrating detailed function configurations of turning controllers.

FIG. 3 is a block diagram illustrating detailed function configurations of the first and second turning controllers 60_1 and 60_2. The first turning controller 60_1 may be configured with a first processor 64 as one processor. The second turning controller 60_2 may be configured with a second processor 66 and a third processor 68 as two processors. Alternatively, the second turning controller 60_2 may be configured with one processor which includes functions of the second processor 66 and functions of the third processor 68. A configuration may be employed such that a part of functions of the second processor 66 is executed by the third processor 68, the functions being described in the following, and a configuration may be employed such that a part of functions of the third processor 68 is executed by the second processor 66, the functions being described in the following. Functional elements belonging to the processors 64, 66, and 68 are realized by actions which are performed by the processors 64, 66, and 68 following predetermined programs.

A description will be given about the first turning controller 60_1. A target turning angle calculator 70_1 calculates the target turning angle $\theta_{t1}$* as a control target based on the steering angle $\theta_{s1}$. The target turning angle calculator 70_1 may calculate the target turning angle $\theta_{t1}$* based on the vehicle velocity v in addition to the steering angle $\theta_{s1}$. By performing control based on the vehicle velocity v, for example, when the vehicle velocity v is low, a setting can be made such that the wheels are turned by a larger angle. A target turning angular velocity calculator 72_1 calculates a target turning angular velocity $\omega_{t1}$* based on the target turning angle $\theta_{t1}$*. A gain adjuster 74_1 adjusts gains $k_{p1}$, $k_{i1}$, $k_{d1}$, and $k_{dmp}$ related to feedback calculation of the turning angle in accordance with a traveling situation such as the vehicle velocity v.

A turning current command value calculator 76_1 uses the set gains and thereby calculates the first turning current command value $I_{t1}$ by feedback calculation by following the following expression (1) based on a turning angle $\theta_{t1}$ and a turning angular velocity $\omega_{t1}$ as parameters of a control target.

$$I_{t1} = K_{p1} \times A_1 + K_{i1} \times B_1 + K_{d1} \times \int A_1 + K_{dmp1} \times C_1 \quad (1)$$

In expression (1), $k_{p1}$, $k_{i1}$, $k_{d1}$, and $k_{dmp1}$ represent a gain of a proportional term, a gain of a derivative term, a gain of an integral term, and a gain of a damping term in PID+Dmp control, respectively. A term $A_1$ represents the absolute value of a turning angle deviation ($\theta_{tl}$*−$\theta_{tl}$), $B_1$ represents the absolute value of a turning angular velocity deviation ($\omega_{t1}$*−$\omega_{t1}$), and $C_1$ represents an actual angular velocity ($\omega_{t1}$).

The first turning controller 60_1 sends the first turning current command value $I_1$ to the first turning driving circuit 62_1.

A description will be given about the second turning controller 60_2. The second processor 66 has the same configuration as the first processor 64, corresponding reference characters are given, and descriptions thereof will not be repeated. Similar to the first processor 64, the second processor 66 calculates the second turning current command value $I_{t2}$ by feedback calculation by following the following expression (2).

$$I_{t2} = K_{p2} \times A_2 + K_{i2} \times B_2 + K_{d2} \times \int A_2 + K_{dmp2} \times C_2 \quad (2)$$

In expression (2), $k_{p2}$, $k_{i2}$, $k_{d2}$, and $k_{dmp2}$ represent the gain of the proportional term, the gain of the derivative term, the gain of the integral term, and the gain of the damping term in PID+Dmp control, respectively. A term $A_2$ represents the absolute value of a turning angle deviation ($\theta_{t2}$*−$\theta_{t2}$), $B_2$ represents the absolute value of a turning angular velocity deviation ($\omega_{t2}$*−$\omega_{t2}$), and $C_2$ represents an actual angular velocity ($\omega_{t2}$).

The third processor 68 has an autonomous steering receiver 78 which receives, from the autonomous driving system 44, a signal indicating that the vehicle is in an autonomous steering state. The autonomous steering state is a state where the autonomous driving system 44 controls turning of the turned wheels 18 not by an operation by the driver. The third processor 68 has a turning angle calculator 80 which calculates a turning angle $\theta_{tc2}$ based on the steering angle $\theta_{s2}$. The third processor 68 has a turning angular velocity calculator 82 which calculates a turning angular velocity $\omega_{tc2}$ based on the steering angle $\theta_{s2}$. Similar to the target turning angle calculator 70_2, the turning angle calculator 80 and the turning angular velocity calculator 82 may calculate the turning angle $\theta_{tc2}$ and the turning angular velocity $\omega_{tc2}$ based on the steering angle $\theta_{s2}$ and the vehicle velocity v.

The third processor 68 has a command value divergence determiner 84 which determines whether the first turning current command value $I_{t1}$ calculated by the first processor 64 diverges from the second turning current command value $I_{t2}$ calculated by the second processor 66. The command value divergence determiner 84 determines that divergence is not present when the difference between the first turning current command value $I_{t1}$ and the second turning current command value $I_{t2}$ is a predetermined value or smaller. The command value divergence determiner 84 determines that divergence is present when the difference between the first turning current command value $I_{r1}$ and the second turning current command value $I_{t2}$ exceeds the predetermined value.

The command value divergence determiner 84 determines whether a rapid steering operation is performed. In a state where the rapid steering operation is performed, unevenness in detection timings, reception timings of detection values, or the like in the systems becomes large. Thus, in a rapid steering operation state, the difference between the first turning current command value $I_{t1}$ and the second turning current command value $I_2$ might become large. Because the divergence between the command values $I_{t1}$ and $I_2$ accompanying the rapid steering operation is not abnormality of devices, in a case where the rapid steering operation is detected, the third processor 68 sets a turning current command value, which is output from the second turning controller 60_2, as the first turning current command value $I_{t1}$ regardless of a result of a divergence determination. A determination of the rapid steering operation is made when the turning angle $\theta_{tc2}$ calculated by the turning angle calculator 80 is a predetermined value or larger and the turning angular velocity $\omega_{tc2}$ calculated by the turning angular velocity calculator 82 is a predetermined value or larger. In addition to or instead of this, the command value divergence determiner 84 determines whether or not the steering device 10 is in a state where the rapid steering operation is performed based on whether or not the autonomous steering state is established. Because there is a possibility that the rapid steering operation is performed when the autonomous steering state is not established, the command value divergence determiner 84 outputs the first turning current command value $I_{t1}$ regardless of the result of the divergence determination. The third processor 68 outputs the second turning current command value $I_{t2}$ (i) when the turning current command values $I_{t1}$ and $I_2$ are divergent and (ii) when the steering device 10 is not in the rapid steering operation state or is not in the state where the rapid steering operation is performed. Accordingly, the turning current command value output from the second turning controller 60$_{-2}$ becomes the second turning current command value $I_{t2}$. In cases other than above, the third processor 68 outputs the first turning current command value $I_{t1}$. Accordingly, the turning current command value output from the second turning controller 60$_{-2}$ becomes the first turning current command value $I_{t1}$.

Figure 4:
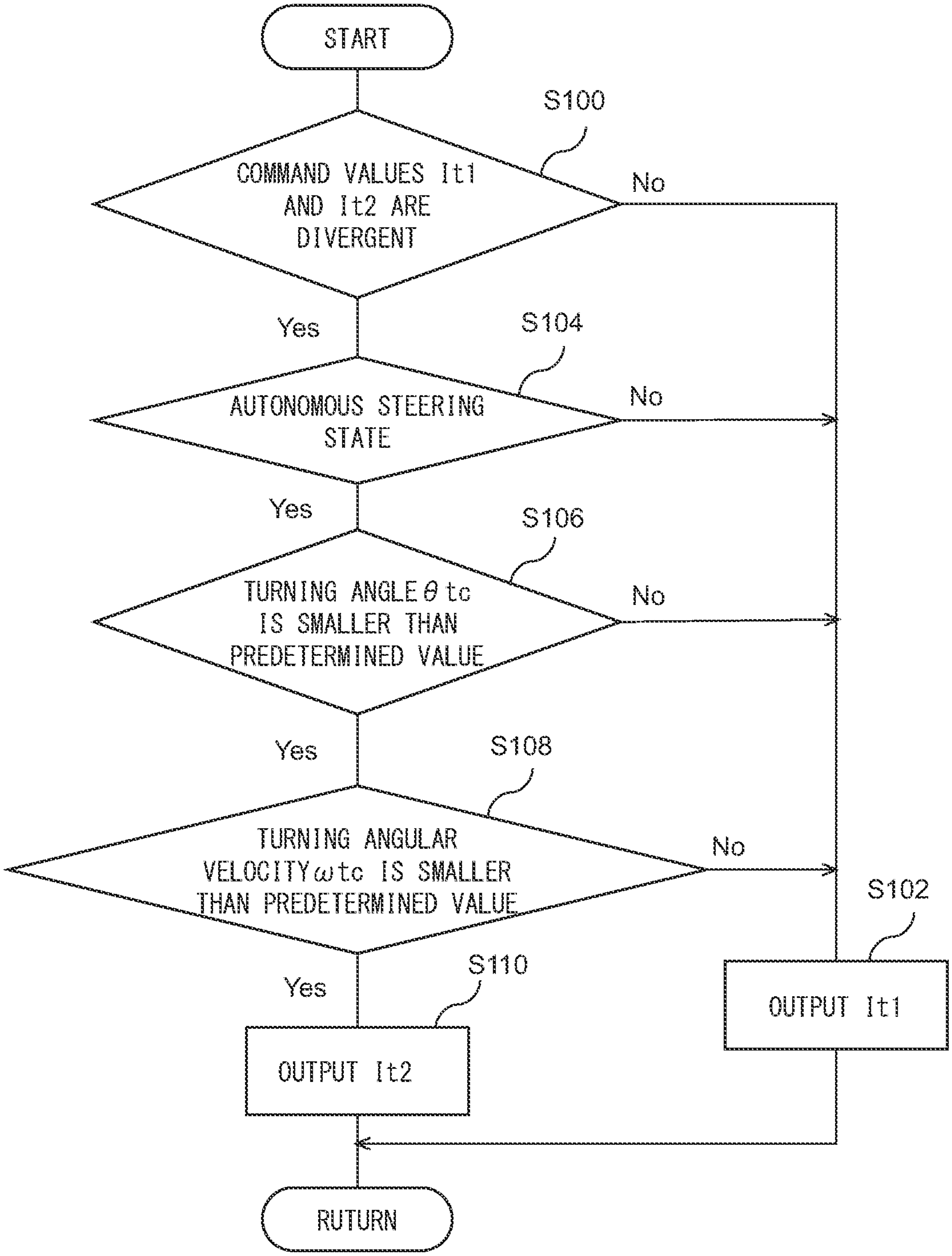
FIG. 4 is a flowchart illustrating a flow of control by a third processor.

FIG. 4 is a flowchart illustrating a control flow of the third processor 68. First, the third processor 68 determines whether the first turning current command value $I_{t1}$ and the second turning current command value $I_{t2}$ are divergent (S100). When those are not divergent, the third processor 68 outputs the first turning current command value $I_{t1}$ (S102). When those are divergent, the third processor 68 determines whether the autonomous steering state is established (S104). When the autonomous steering state is not established, the third processor 68 executes the processing in step S102. When the autonomous steering state is established, the third processor 68 assesses whether the turning angle $\theta_{tc2}$ calculated by the turning angle calculator 80 is smaller than the predetermined value (S106). When the turning angle $\theta_{tc2}$ is not smaller than the predetermined value, the third processor 68 executes the processing in step S102. When the turning angle $\theta_{tc2}$ is smaller than the predetermined value, the third processor 68 assesses whether the turning angular velocity $\omega_{tc2}$ calculated by the turning angular velocity calculator 82 is smaller than the predetermined value (S108). When the turning angular velocity $\omega_{tc2}$ is not smaller than the predetermined value, the third processor 68 executes the processing in step S102. When the turning angular velocity $\omega_{tc2}$ is smaller than the predetermined value, the third processor 68 outputs the second turning current command value $I_{t2}$ (S110).

The third processor 68 may include either one of a determination about the autonomous steering state (S104) and a determination about the rapid steering operation (S106 and S108). Order of steps S100, S104, S106, and S108 can be switched. For example, the third processor 68 may be configured to first determine whether the autonomous steering state is established (104) and to determine whether the command values are divergent when the autonomous steering state is established (S100).

Figure 5:
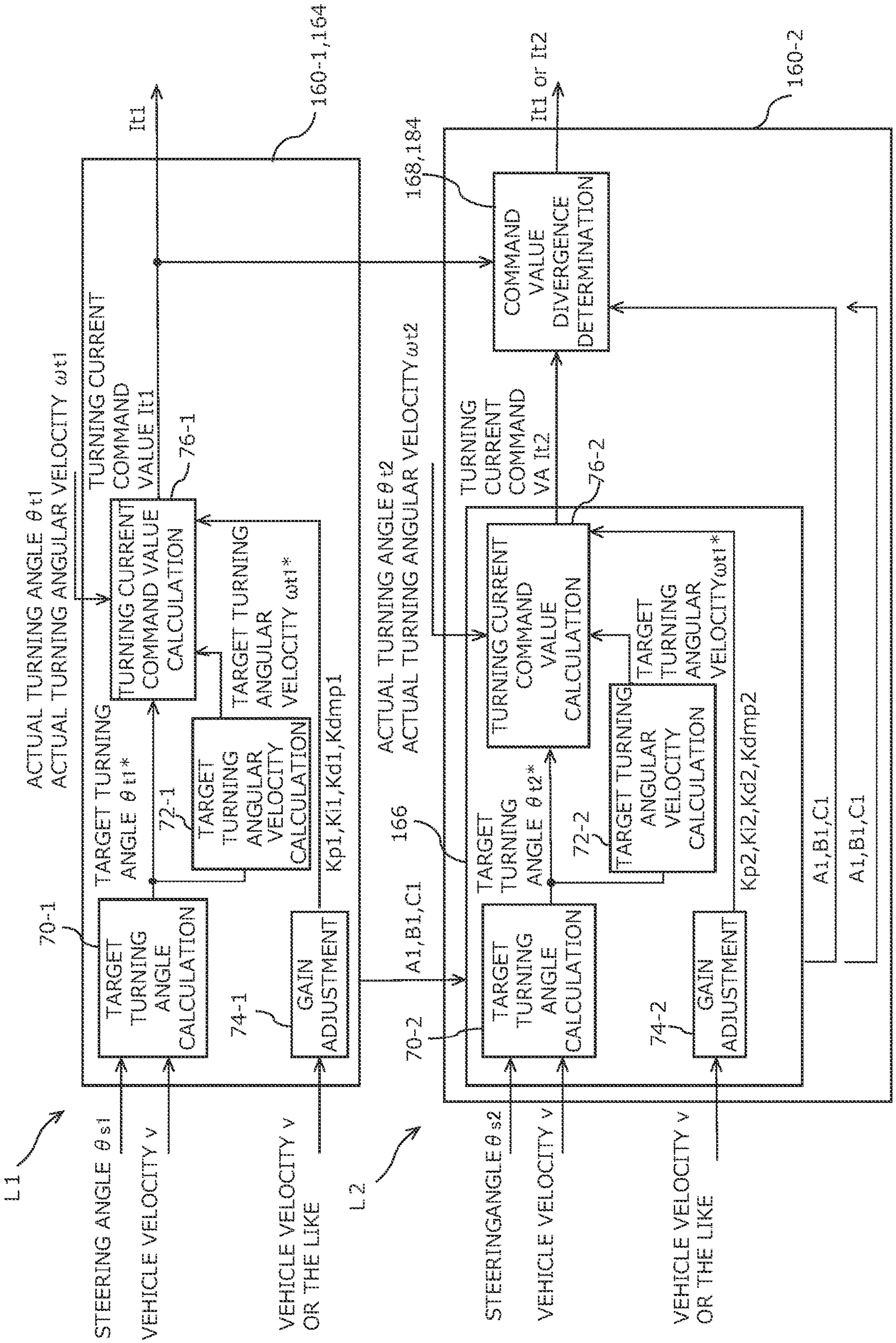
FIG. 5 is a block diagram illustrating a detailed function configuration of other turning controllers.

FIG. 5 is a block diagram illustrating function configurations of first and second turning controllers 160$_{-1}$ and 160$_{-2}$ which are substitutable for the first and second turning controllers 60$_{-1}$ and 60$_{-2}$. The same reference characters are assigned to configuration elements similar to those of the above-described first and second turning controllers 60$_{-1}$ and 60$_{-2}$, and descriptions thereof will not be repeated. The first turning controller 160$_{-1}$ may be configured with a first processor 164 as one processor. The second turning controller 160$_{-2}$ may be configured with a second processor 166 and a third processor 168 as two processors. Alternatively, the second turning controller 160$_{-2}$ may be configured with one processor which includes functions of the second processor 166 and functions of the third processor 168. A configuration may be employed such that a part of functions of the second processor 166 is executed by the third processor 168, and a configuration may be employed such that a part of functions of the third processor 168 is executed by the second processor 166. Functional elements belonging to the processors 164, 166, and 168 are realized by actions which are performed by the processors 164, 166, and 168 following predetermined programs.

The first processor 164 has a configuration similar to that of the above-described first processor 64. The first processor 164 can send to the second processor 166 a deviation (turning angle deviation $A_1=\theta_{t1}*-\theta_{t1}$) between a target value $\theta_{t1}*$ of the turning angle as a control target parameter in feedback control and an actual value $\theta_{t1}$. The first processor 164 can send to the second processor 166 the deviation (turning angular velocity deviation $B_1=\omega_{t1}*-\omega_{t1}$) between a target value $\omega_{t1}$) of the turning angular velocity as a control target parameter in feedback control and an actual value $\omega_{t1}$. The first processor 164 can send to the second processor 166 an actual value (angular velocity $C_1=\omega_{t1}$) of the turning angular velocity as a control target parameter in feedback control.

The second processor 166 has a configuration similar to that of the above-described second processor 66. The second processor 166 can send to the third processor 168 the deviation (turning angle deviation $A_2=\theta_{t2}*-\theta_{t2}$) between a target value $\omega_{t2}*$ of the turning angle as the control target parameter in feedback control and an actual value $\theta_{t2}$. The second processor 166 can send to the third processor 168 the deviation (turning angular velocity deviation $B_2=\omega_{t2}*-\omega_{t2}$) between a target value $\omega_{t2}*$ of the turning angular velocity as the control target parameter in feedback control and an actual value $\omega_{t2}$. The second processor 166 can send to the third processor 168 an actual value (angular velocity $C_2=\omega_{t2}$) of the turning angular velocity as the control target parameter in feedback control.

The second processor 166 can send to the third processor 168 the turning angle deviation $A_1$, the turning angular velocity deviation $B_1$, and the angular velocity $C_1$, which are received from the first processor 164.

The third processor 168 has a command value divergence determiner 184 which determines whether the first turning current command value $I_1$ calculated by the first processor 164 diverges from the second turning current command value $I_{t2}$ calculated by the second processor 166. Similar to the above-described command value divergence determiner 84, the command value divergence determiner 184 performs the divergence determination.

The command value divergence determiner 184 calculates a difference $\Delta A$ (=abs($A_1-A_2$)) between the turning angle deviation $A_1$ of the first system $L_1$ and the turning angle deviation $A_2$ of the second system $L_2$, a difference $\Delta B$ (=abs($B_1-B_2$)) between the turning angular velocity deviation $B_1$ and the turning angular velocity deviation $B_2$, and a difference $\Delta C$(=abs($C_1-C_2$)) between the angular velocity $C_1$ and the angular velocity $C_2$. Those differences $\Delta A$, $\Delta B$, and $\Delta C$ become large in the rapid steering state. Consequently, the command value divergence determiner 184 can make a determination of the rapid steering state based on the fact that the differences ΔA, ΔB, and ΔC are large. When any of the differences ΔA, ΔB, and ΔC is a predetermined value or larger, the third processor 168 outputs the first turning current command value $I_{t1}$ regardless of the result of the divergence determination. The third processor 168 outputs the second turning current command value $I_2$ when the turning current command values $I_{t1}$ and $I_{t2}$ are divergent and when the steering device 10 is not in the rapid steering operation state (that is, when the differences ΔA, ΔB, and ΔC are smaller than predetermined values). Accordingly, the turning current command value output from the second turning controller 160_2 becomes the second turning current command value $I_{t2}$. In cases other than above, the third processor 168 outputs the first turning current command value $I_{t1}$. Accordingly, the turning current command value output from the second turning controller 160_2 becomes the first turning current command value $I_{t1}$.

Figure 6:
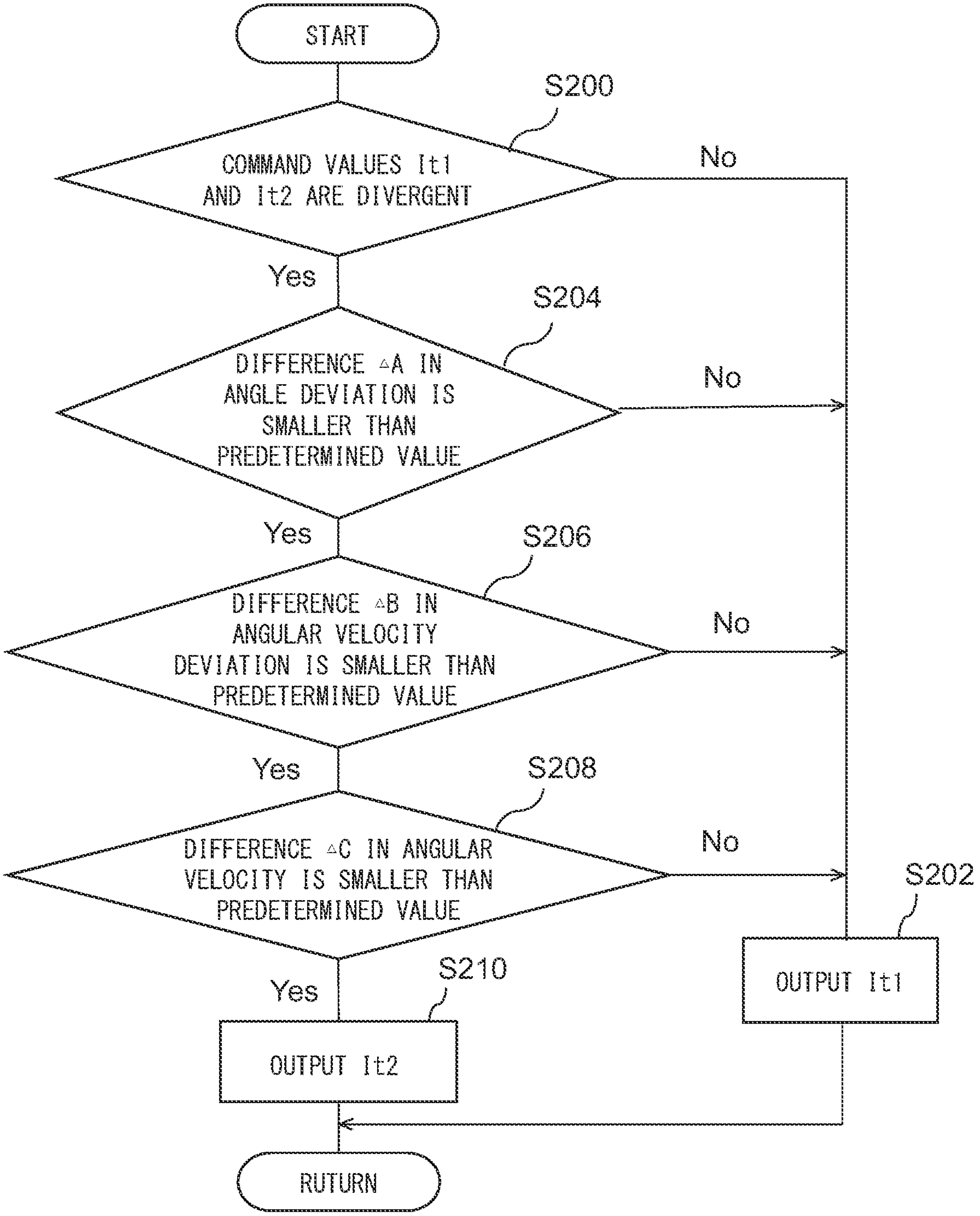
FIG. 6 is a flowchart illustrating a flow of control by another third processor.

FIG. 6 is a flowchart illustrating a control flow of the third processor 168. First, the third processor 168 determines whether the first turning current command value $I_{t1}$ and the second turning current command value $I_2$ are divergent (S200). When those are not divergent, the third processor 168 outputs the first turning current command value $I_{t1}$ (S202). When those are divergent, the third processor 168 determines whether the difference ΔA in the turning angle deviation is smaller than the predetermined value (S204), determines whether the difference ΔB in the turning angular velocity deviation is smaller than the predetermined value (S206), and determines whether the difference ΔC in the angular velocity is smaller than the predetermined value (S208). When determinations in three steps S204, S206, and S208 are all affirmative, the third processor 168 outputs the second turning current command value $I_{t2}$ (S210). When any one of the determinations in the three steps S204, S206, and S208 is negative, the third processor 168 executes the processing in step S202. Order of steps S200, S204, S206, and S208 can be switched. For example, the third processor 168 may be configured to first determine whether the steering device 10 is in the rapid steering state (S204 to S208) and to determine whether the turning current command values are divergent when the steering device 10 is not in the rapid steering state (S200).

In the above, a description is given about control of the turning actuator 16 in the rapid steering operation. Similar control may be performed for the reaction force actuator 26 in the rapid steering operation.

The invention claimed is:

1. A motor control device controlling a motor having a first coil set and a second coil set, used for a turning actuator of a steer-by-wire steering device, the motor control device comprising:
- a first driving circuit which supplies a driving current based on a first command value to the first coil set;
- a second driving circuit which is capable of supplying a driving current based on a second command value to the second coil set;
- a first processor configured to calculate the first command value based on a first detection value of a steering angle of a steering wheel and send the first command value to the first driving circuit;
- a second processor configured to calculate the second command value based on a second detection value of the steering angle of the steering wheel; and
- a third processor configured to send the first command value to the second driving circuit when the first command value and the second command value are not divergent and to send the second command value to the second driving circuit when the first command value and the second command value are divergent, wherein
- the third processor is configured such that in a rapid steering state, the third processor sends the first command value to the second driving circuit regardless of whether or not the first command value and the second command value are divergent.

2. The motor control device according to claim 1, wherein
- the third processor is configured such that when an autonomous steering state is not established, the third processor sends the first command value to the second driving circuit regardless of whether or not the first command value and the second command value are divergent.

3. A motor control device controlling a motor having a first coil set and a second coil set, used for a turning actuator of a steer-by-wire steering device, the motor control device comprising:
- a first driving circuit which supplies a driving current based on a received first command value to the first coil set;
- a second driving circuit which is capable of supplying a driving current based on a received second command value to the second coil set;
- a first processor configured to calculate the first command value based on a first detection value of a steering angle of a steering wheel and send the first command value to the first driving circuit;
- a second processor configured to calculate the second command value based on a second detection value of the steering angle of the steering wheel; and
- a third processor configured to send the first command value to the second driving circuit when the first command value and the second command value are not divergent and to send the second command value to the second driving circuit when the first command value and the second command value are divergent, wherein
- the third processor is configured such that when an autonomous steering state is not established, the third processor sends the first command value to the second driving circuit regardless of whether or not the first command value and the second command value are divergent.

4. The motor control device according to claim 1, wherein
- the third processor is configured to make a determination of the rapid steering state when a turning angle of a vehicle wheel, the turning angle being calculated based on the steering angle, is a predetermined value or greater and when a turning angular velocity of the vehicle wheel, the turning angular velocity being calculated based on the steering angle, is a predetermined value or greater.

5. The motor control device according to claim 1, wherein
- the first processor is configured to calculate the first command value by feedback calculation about a turning angle and a turning angular velocity of the vehicle wheel,
- the second processor is configured to calculate the second command value by the feedback calculation about the turning angle and the turning angular velocity of the vehicle wheel, and
- the third processor is configured to make a determination of the rapid steering state
  - when a difference between a deviation between a target value of the turning angle and an actual value in the first processor and a deviation between a target value of the turning angle and an actual value in the second processor is a predetermined value or greater, when a difference between a deviation between a target value of the turning angular velocity and an actual value in the first processor and a deviation between a target value of the turning angular velocity and an actual value in the second processor is a predetermined value or greater, or when a difference between an actual value of a turning angular velocity in the first processor and an actual value of the turning angular velocity in the second processor is a predetermined value or greater.

* * * * *